(12) United States Patent
Boulos et al.

(10) Patent No.: US 12,411,565 B2
(45) Date of Patent: Sep. 9, 2025

(54) TWO STAGE TRIGGERING IN A HANDHELD DEVICE

(71) Applicant: Meta Platforms Technologies, LLC, Menlo Park, CA (US)

(72) Inventors: Khaled Boulos, Seattle, WA (US); Yan Gouts, Bellevue, WA (US); Derrick Readinger, Philadelphia, PA (US); Marcus Peterson, Kirkland, WA (US); Lorenz Henric Jentz, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/593,288

(22) Filed: Mar. 1, 2024

(65) Prior Publication Data

US 2024/0345671 A1    Oct. 17, 2024

Related U.S. Application Data

(60) Provisional application No. 63/487,916, filed on Mar. 2, 2023.

(51) Int. Cl.
| | |
|---|---|
| *G06F 3/01* | (2006.01) |
| *G06F 3/02* | (2006.01) |
| *G06F 3/0338* | (2013.01) |
| *G06F 3/0354* | (2013.01) |
| *G06F 3/038* | (2013.01) |

(52) U.S. Cl.
CPC ............ *G06F 3/0383* (2013.01); *G06F 3/016* (2013.01); *G06F 3/0202* (2013.01); *G06F 3/0338* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 2014/0315642 A1 | 10/2014 | Grant et al. | |
| 2018/0296913 A1* | 10/2018 | Chen | A63F 13/214 |
| 2018/0345133 A1* | 12/2018 | Gassoway | A63F 13/24 |

OTHER PUBLICATIONS

International Search Report and Written Opinion for International Application No. PCT/US2024/018321, mailed May 10, 2024, 15 pages.

* cited by examiner

*Primary Examiner* — Carl Adams
(74) *Attorney, Agent, or Firm* — McDermott Will & Emery LLP

(57) ABSTRACT

A controller includes a housing, and a handle extends from a portion of the housing. The housing defines an internal cavity. The housing includes a thumb plate, wherein the thumb plate comprises a touchpad, one or more actuators, and/or a joystick. The one or more actuators comprise buttons. The controller includes a logic board including a processor oriented in the internal cavity. The controller comprises a switch assembly oriented in the internal cavity and configured to engage the logic board. The handle comprises at least one trigger oriented for movement into the internal cavity. The trigger can include a magnet and magnetic sensor.

19 Claims, 11 Drawing Sheets

TWO STAGE TRIGGERING IN A HANDHELD DEVICE

CROSS REFERENCE TO RELATED APPLICATIONS

This present application claims the benefit of priority under 35 U.S.C. § 119 (e) to U.S. Provisional Application No. 63/487,916, filed Mar. 2, 2023, the disclosure of which is hereby incorporated by reference in its entirety for all purposes.

TECHNICAL FIELD

The present disclosure generally relates to haptic response in handheld devices, and more particularly, to haptic response in a handheld device at the index finger.

BACKGROUND

When interacting in a virtual/augmented reality, the experience can be impacted by the tactile feedback the user experiences when engaging with virtual objects. When the user attempts to manually manipulate items, certain actions such as gripping, pinching and pulling may be lacking. The issue can be the system's response to the pressure applied by the index finger. Richer feedback in the interaction with the finger allows for more precise manipulation of objects and can increase the realism with the various applications in a virtual environment including games, training, surgery, and simulation as use cases for precision grip.

BRIEF SUMMARY

The subject disclosure provides for controllers for artificial reality environments and related systems and methods. A user is allowed to perform fine-motor activities within artificial reality environments. Aspects of the present disclosure relate to a controller. The controller can comprise housing that includes a handle. The housing can define an internal cavity. The housing can include a thumb plate, wherein the thumb plate can comprise a touchpad, one or more actuators, and/or a joystick, wherein the one or more actuators comprise buttons. The controller can include a logic board that includes a processor oriented in the internal cavity. The controller can also include a switch assembly oriented in the internal cavity and configured to engage the logic board. The handle can also comprise at least one trigger oriented for movement into the internal cavity. The trigger can include a magnet and magnetic sensor.

One aspect of the present disclosure relates to a method for sensing inputs to a controller configured for interacting with an artificial reality environment. The method may include determining a switch assembly activation from a switch assembly oriented in the controller. The method may include receiving trigger inputs from a trigger on the controller, wherein the trigger comprises a magnet and magnetic sensor. The method may include determining a magnetic field measurement from the magnetic sensor. The method may include determining a force value based on the magnetic field measurement, wherein the force value exceeds a first inflection threshold. The method may include in response to the first inflection threshold being exceeded, generating a haptic feedback for a user. The method may include generating a virtual interaction based on the trigger inputs. The method may include generating a virtual interaction based on the movements, the actuator inputs, the touchpad inputs, the joystick inputs, and/or the trigger inputs. The method may include causing display of the virtual interaction.

Another aspect of the present disclosure relates to a system configured for sensing inputs to a controller configured for interacting with an artificial reality environment. The system may include one or more hardware processors configured by machine-readable instructions. The processor(s) may be configured to determine a switch assembly activation from a switch assembly oriented in the controller. The processor(s) may be configured to receive trigger inputs from at least one trigger on a handle coupled to the controller. The processor(s) may be configured to determine a magnetic field measurement from a magnetic sensor. The processor(s) may be configured to determine a force value based on the magnetic field measurement, wherein the force value exceeds a first inflection threshold. The processor(s) may be configured in response to the first inflection threshold being exceeded, to generate a haptic feedback for a user. The processor(s) may be configured to generate a virtual interaction based on the trigger inputs. The virtual interaction includes a fine motor activity. The processor(s) may be configured to cause display of the virtual interaction. The display may be generated through a head-mounted display for artificial reality environments. The display of the virtual interaction can include presenting a virtual hand that performs part or all of the virtual interaction.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

With existing artificial reality systems, users may have limited ability to manipulate virtual objects in artificial reality environments. For example, a user may be able to use a handheld controller to perform coarse manual actions such as pushing a door open or "grasping" a hammer with a virtual hand. Fine motor actions in artificial reality environments, however, are not facilitated with existing technologies. Fine motor actions or activities may involve synchronization of a user's hands and fingers through the user coordinating of small muscles in movement with the user's eyes.

The implementations described herein aim to measure and transmit the approximate force applied between the index finger and the thumb to VR applications wishing to create virtual analogues for fine manipulation, squeezing or breaking of objects at low forces. The Two-Stage implementation is an innovation whereby the sensing of force is derived from the existing index finger trigger mechanism which requires negligible cost and provides more robust performance. The system can comprise a sensing mechanism to determine the trigger position of the forefinger (index finger) . The primary portion of the trigger travel has constant force, and the secondary portion of travel introduces a compressible spring element (rubber, foam, and metal coil are some possible implementations) which has a linearly increasing force. The relationship between the force applied in the second stage can therefore be derived from the existing sensing mechanism for position and communicated to the simulation in the virtual environment to allow for force based interactions as well as fine manipulation.

Figure 1:
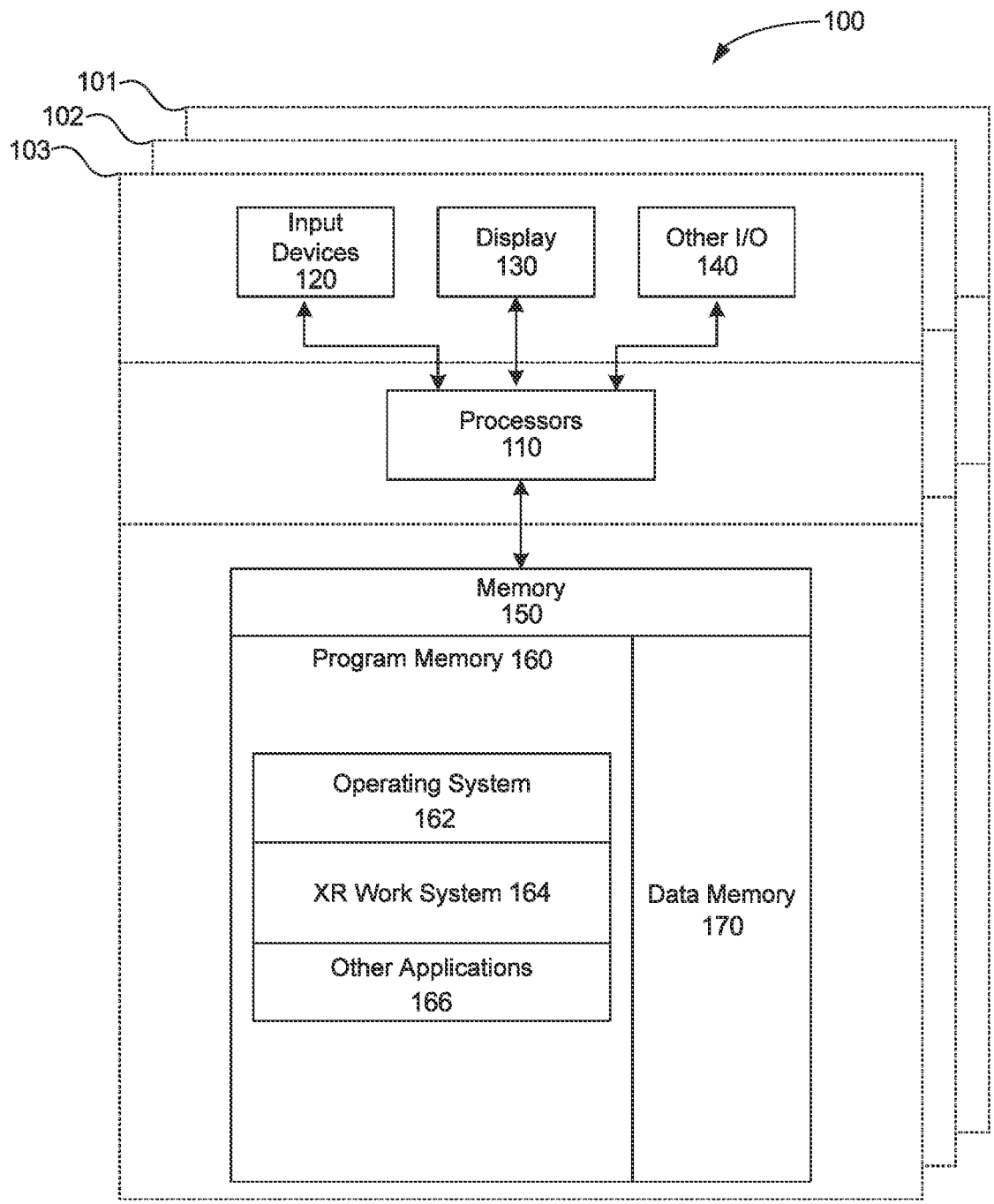
FIG. 1 is a block diagram illustrating an overview of devices on which some implementations of the disclosed technology can operate.

Several implementations are discussed below in more detail in reference to the figures. FIG. 1 is a block diagram illustrating an overview of devices on or with which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across one of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
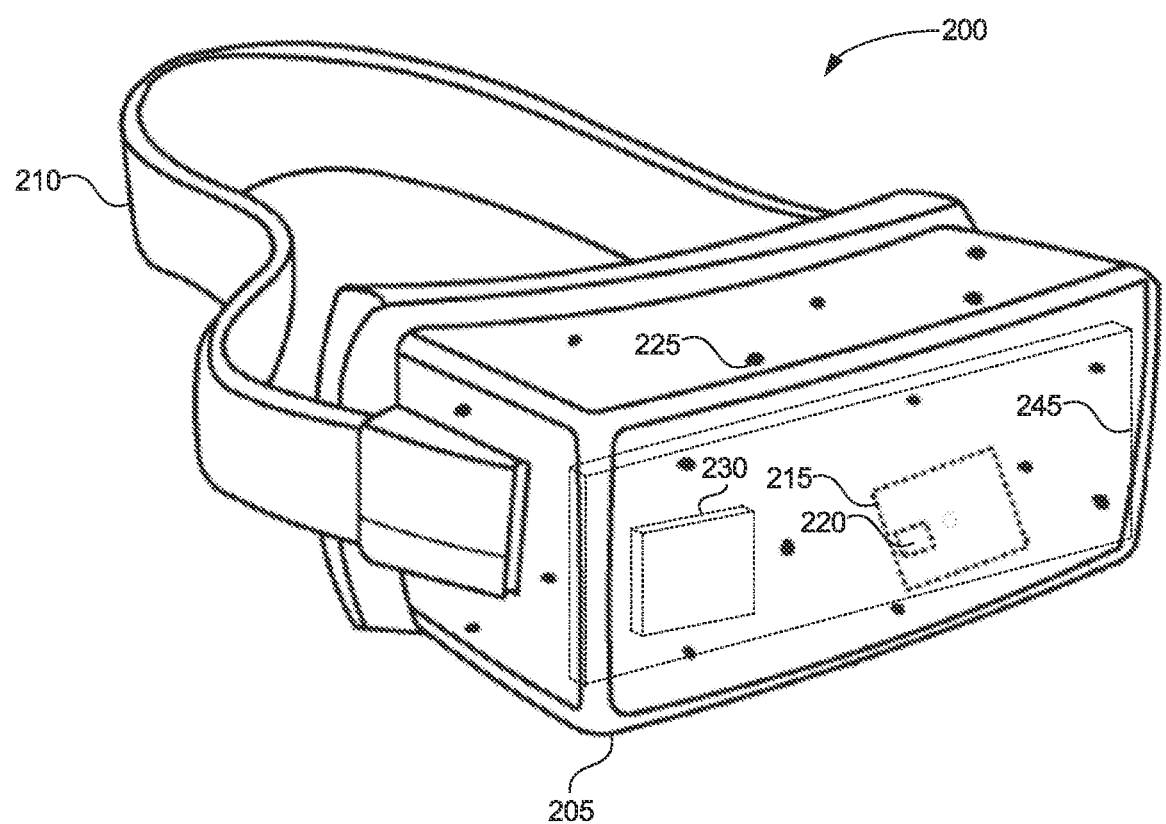
FIG. 2A is a wire diagram of a virtual reality head-mounted display (HMD), in accordance with one or more implementations.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include, e.g., one or more accelerometers, gyroscopes, magnetometers, other non-camera-based position, force, orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
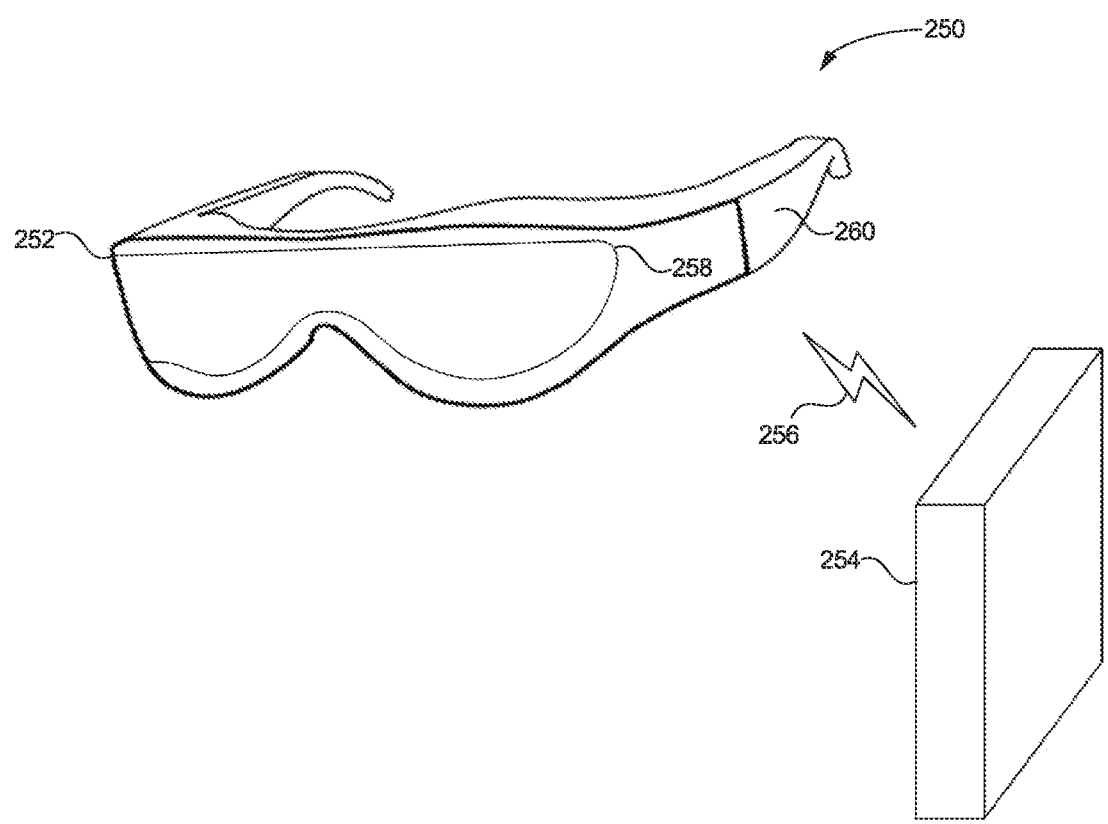
FIG. 2B is a wire diagram of a mixed reality HMD system which includes a mixed reality HMD and a core processing component, in accordance with one or more implementations.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3A:
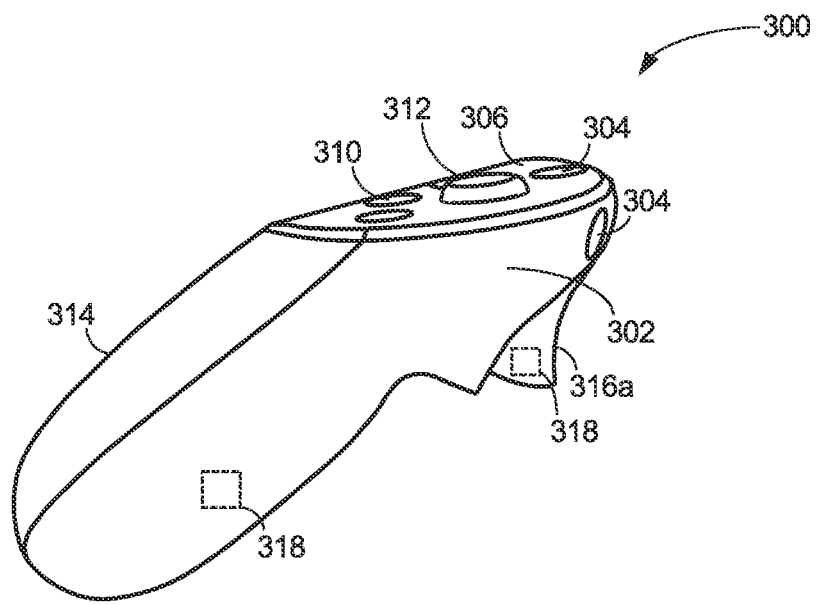
FIGS. 3A and 3B illustrate different views of an example controller, in accordance with one or more implementations.
Figure 3B:
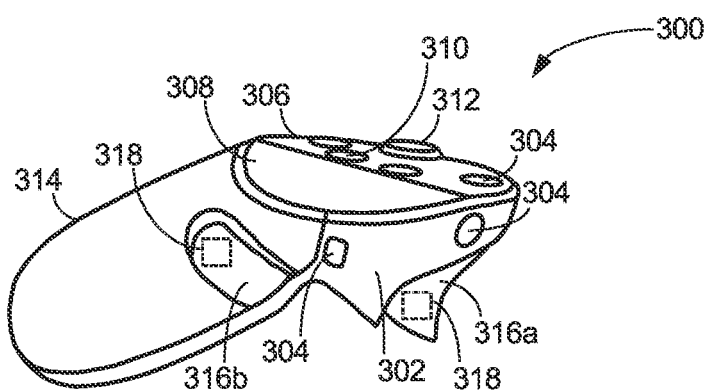

FIGS. 3A and 3B illustrate different views of an example self-tracking controller 300, in accordance with one or more implementations. The controller 300 may be configured for interacting with an artificial reality environment. The controller 300 may be configured to communicatively pair with a head-mounted display (e.g., the HMD 200 of FIG. 2A and/or the HMD system 250 of FIG. 2B) for artificial reality environments. The controller 300 may be one of a pair of controllers configured to be used contemporaneously (e.g., one in each hand of a user).

The controller 300 may include a housing 302. The housing 302 may include at least one sensor 304. The sensor(s) 304 may be configured to collect information used to determine a position and/or motion of the controller. The information may include optical information (e.g., visible, infrared, etc.), spatial information (e.g., LIDAR output), movement information (e.g., MEMS output), biometric information (e.g., whether user is holding controller 300) and/or other types of information. The sensor(s) 304 may be located on at least one side of the housing 302. The sensor(s) 304 may include at least one camera. In some embodiments, the controller 300 may include a first sensor 304 and a second sensor 304 located on different sides of the housing 302. A field of view of the first sensor 304 may overlap with a field of view of the second sensor 304.

The sensor(s) 304 may be configured for self-tracking movements by the controller 300. In other words, the sensor(s) 304 may be configured to facilitate determinations of the position and/or motion of the controller 300 without external sensors. Because external sensors are not needed, the controller 300 may have an unlimited tracking volume (or at least one not defined by the placement of external sensors).

The controller 300 may include a thumb plate 306 coupled to the housing 302. The thumb plate 306 may include a touchpad 308, one or more actuators 310, a joystick 312, and/or other components. The touchpad 308 may be configured to contact a user's thumb. The user may provide inputs to the touchpad 308 with their thumb by touching different locations on the touchpad 308, moving their thumb across the touchpad 308, applying pressure to the touchpad 308, and/or other thumb gestures. The actuator(s) 310 may include buttons and/or other binary input devices. The joystick 312 may be configured to move linearly (e.g., up, down, left, right, diagonal, etc.), circularly (e.g., clockwise, counterclockwise, etc.), and/or in other motions. In some implementations, the joystick 312 may be configured to be depressed (e.g., a binary button push).

The housing 302 of the controller 300 may include a handle 314. The controller 300 may be configured for either a right hand (e.g., the controller 300 as shown in FIG. 3A) or a left hand (e.g., the controller 300 shown in FIG. 3B). The handle 314 may be configured to be held by the user by grasping with three or more fingers around the handle 314. The handle 314 may include one or more actuators 310 and/or one or more triggers 316. When the user is holding the controller 300, the user's index finger may align with trigger 316a and/or the user's thumb may align with trigger 316b. The thumb plate 306 may be positioned such that, when the user is holding the handle 314 of the controller 300 with one hand, the user's thumb can rest on the thumb plate 306 and/or apply orthogonal force to the thumb plate 306. The controller 300 may be configured to activate a precision pinch feature based on inputs received from the touchpad 308 and/or at least one trigger 316. For example, the precision pinch feature may be based at least in part on simultaneous inputs received from the touchpad and at least one trigger.

The controller 300 may include one or more haptics actuators 318. The haptics actuator(s) 318 may be configured to provide haptic feedback to a user holding the controller 300. The haptics actuator(s) 318 may be configured to provide haptic feedback to a user performing a fine motor activity. The haptic feedback may provide an experience of touch through application of one or more of vibrations, force, motions, and/or other haptic feedback. Examples of haptics actuator(s) 318 may include one or more of an eccentric rotating mass (ERM) actuator, a linear resonant actuator (LRA), piezoelectric actuators, servomotors, and/or other haptics actuators. In some implementations, haptic feedback is localized at one or more different positions on the controller 300. For example, in some implementations, the controller 300 comprises a first haptics actuator 318 disposed at a trigger 316. The controller 300 may include a second haptics actuator 318 disposed at the thumb plate 306. Thus, haptic feedback can be applied selectively to the user's index finger, the user's thumb, the user's palm, and/or other locations.

The trigger 316 can be oriented on a side surface of the housing 302. The housing can define an interior cavity such that squeezing the trigger can cause a portion of the trigger 316 to enter the cavity 330. The trigger 316 can comprise a material with sufficient thickness to transfer the force from the fingers to the internal components of the controller 300. The trigger(s) 316 may have variable resistance when pulled by the user. That is, the resistance felt by the user when they squeeze a trigger 316 may be different at different times. The variable resistance may be determined in response to and/or based on a fine motor activity performed by a user. For example, the trigger resistance may increase when an index finger and/or thumb of a virtual hand being controlled by controller 300 comes into contact with a virtual object (e.g., when picking up the virtual object). Such an increase in resistance may give the user a sensation of "touching" the virtual object. According to some implementations, the trigger(s) 316 may be configured with a long throw (e.g., more than one centimeter of travel) or a short throw (e.g., less than one centimeter of travel).

Figure 4:
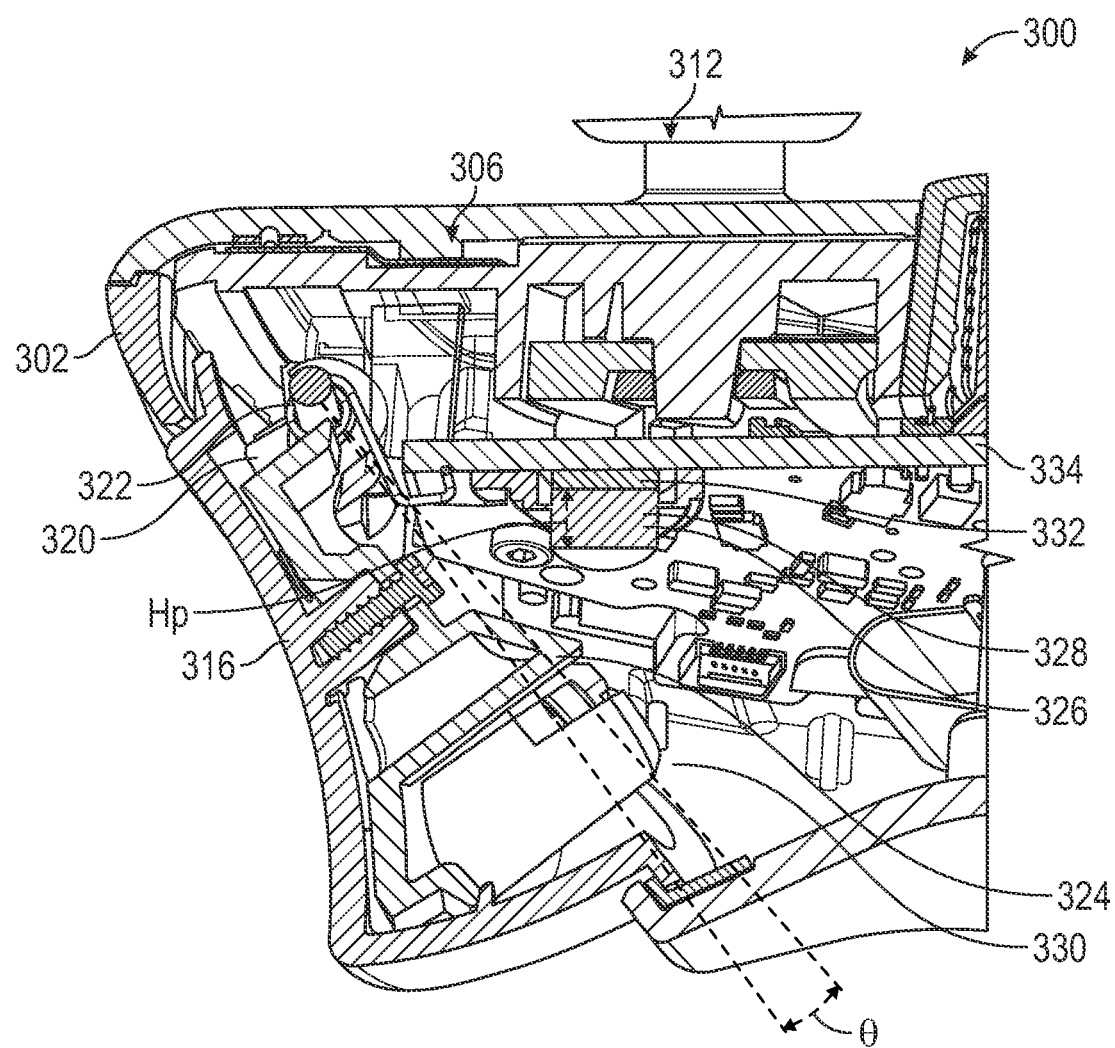
FIG. 4 illustrates a side cross-sectional view of a controller in an inactive state.
Figure 5:
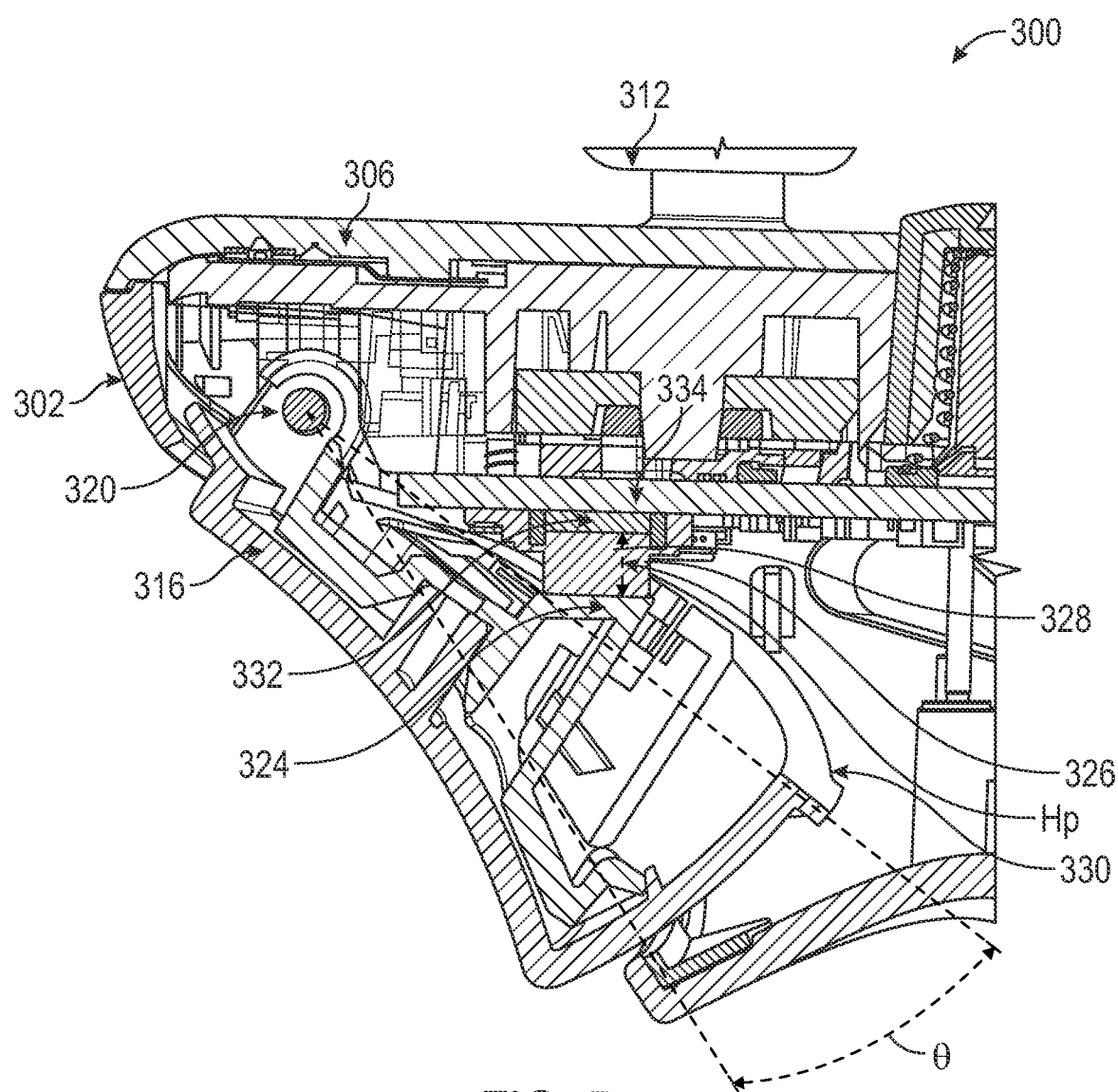
FIG. 5 illustrates a side cross-sectional view of a controller device in a second activated state.
Figure 6:
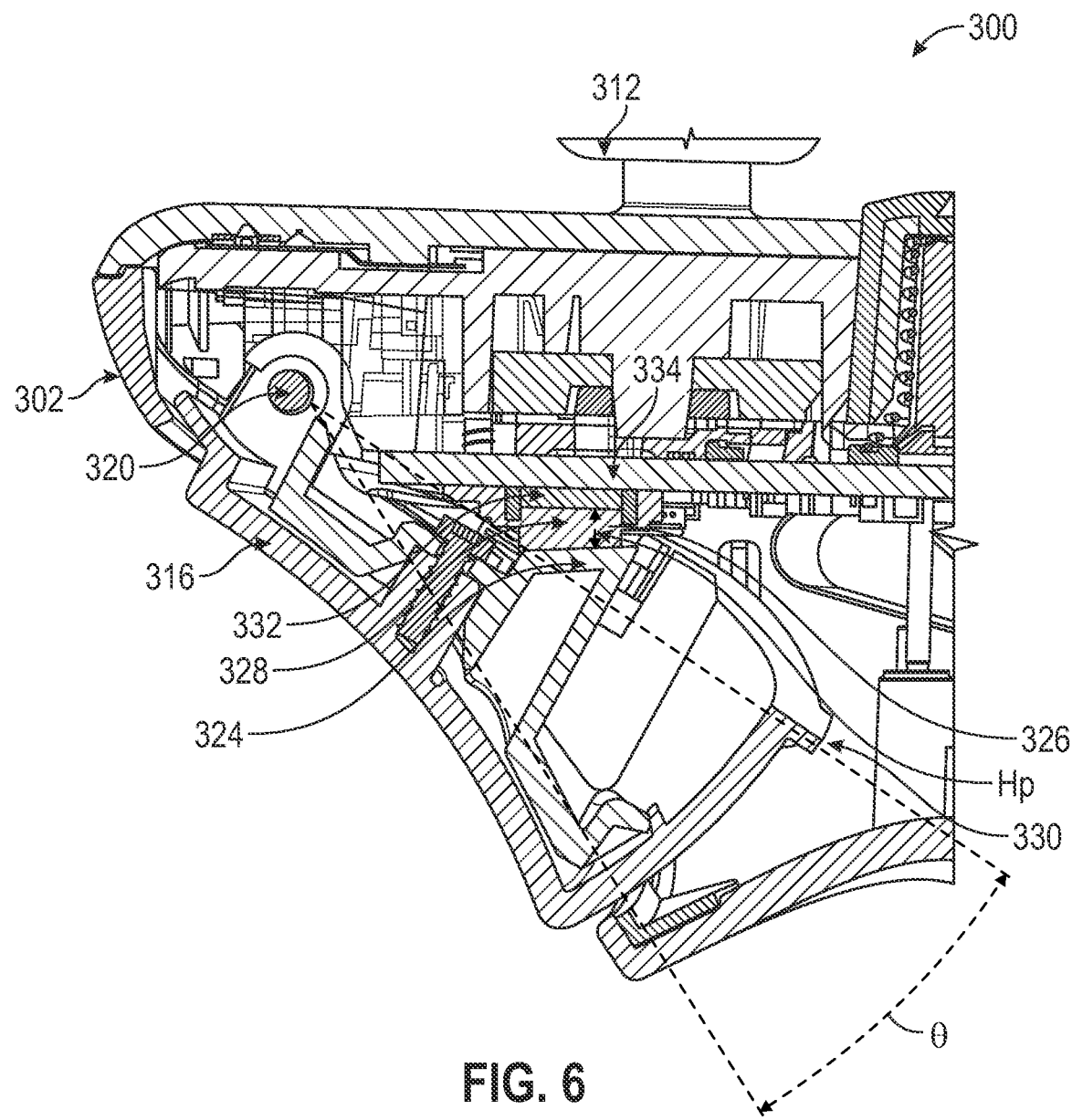
FIG. 6 illustrates a side cross-sectional view of a controller in a third activated state.

In a further aspect, as depicted in FIGS. 4-6, the controller 300 can comprise components that can further simulate a realistic gripping experience in the virtual/augmented reality environment using a two stage trigger implementation. As shown in FIGS. 4-6, applying a force to the trigger 316 can cause the trigger to rotate about a pivot point 320. As the trigger is squeezed by the fingers, the trigger angle (θ) will increase. The trigger can comprise a spring 322. In a further aspect, the spring can be a torsion spring. The spring 322 can be biased to keep the trigger outside of the cavity of the housing 302 when there is no force applied. In a further aspect, the force exerted by the gripping motion can contribute to a first stage of force/distance interaction. The trigger 316 can include a magnet and a magnetic sensor (not shown). For example, the magnetic sensor can be a Hall effect sensor (HES) configured to detect a presence and/or magnitude of a magnetic field by using the Hall effect. The HES provides an analog output that is proportional to the magnetic field detected. As the magnet embedded in the trigger changes position, the output of the HES will reflect that change. The HES dynamic range millitesla (mT) can be derived from the magnet strength, HES position on and total measurable trigger throw. HES noise, along with the analog-digital-conversion (ADC) noise can dictate the necessary processing gain (which affects bandwidth) in order to achieve the required effective resolution.

Figure 7:
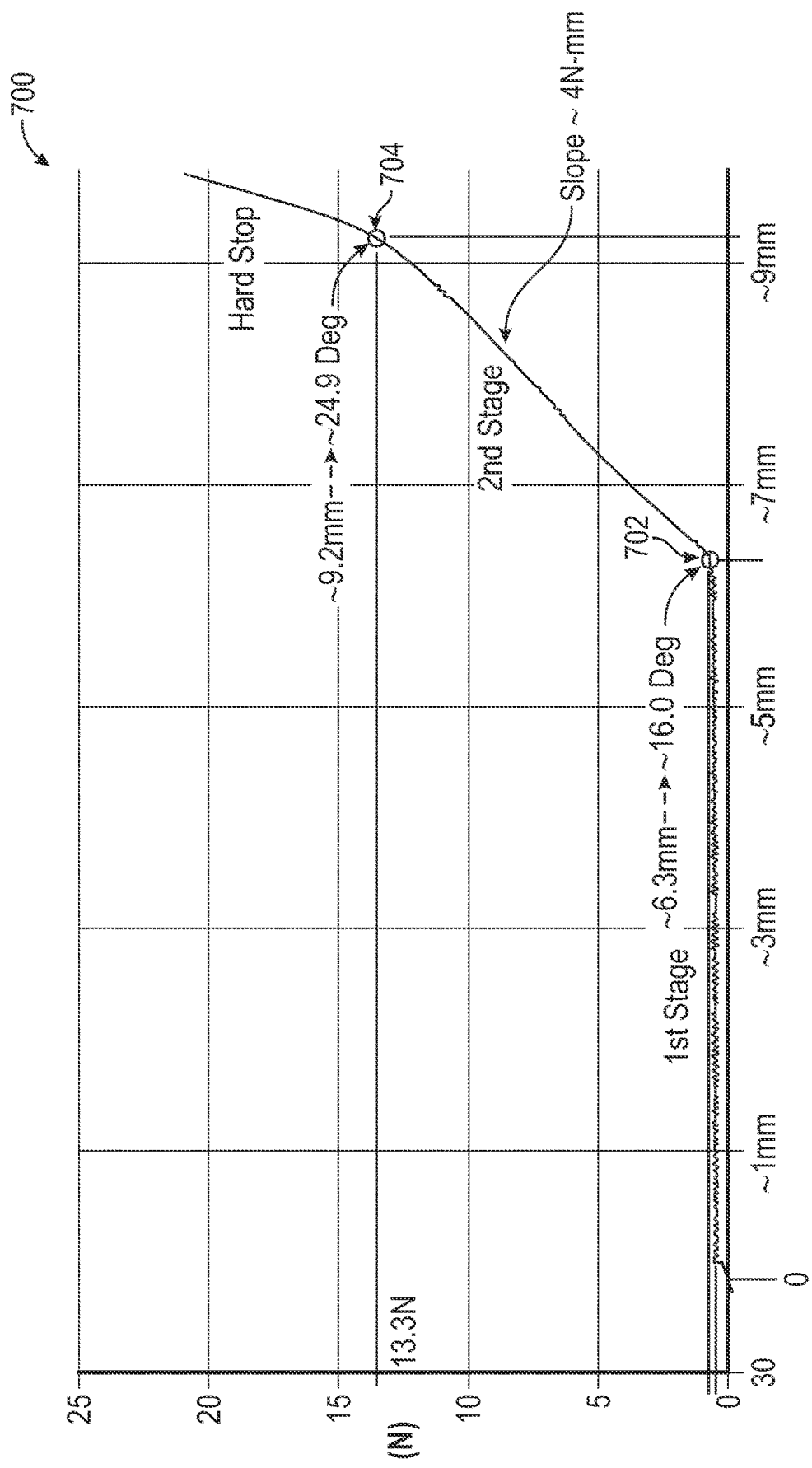
FIG. 7 depicts a force-distance graph detailing a transition between a first stage and second stage.

The controller 300 can comprise a switch assembly 326 configured to initiate a change in the haptic response experienced by the user from the approximately constant force response of the first stage to the linear force-distance response of the second stage as depicted in the force-distance relationship graph 700 in FIG. 7. The switch assembly 326 can be engaged by the trigger 316, in particular a plunger 324. The plunger 324 can be oriented on a surface of the trigger 316, wherein the rotation of the trigger about the pivot point 320 causes the plunger 324 to engage the switch assembly transferring the force applied by the user to the switch assembly. The switch assembly 326 can comprise a tab 328. In a further aspect, the tab 328 can comprise a resilient material such as an elastomeric component. The elastomeric properties of the tab 328 allow the tab to deform proportionately to the force applied and then return to its original shape when the force is removed. For example, tab 328 can comprise a rubber or silicone.

Similar to the tab 328, a puck 332 can be a tab-like structure with volume that can be oriented between the tab 328 and a logic board 334. The logic board 334 can be oriented in the cavity of the controller and include a processor to generate electrical signals and perform calibrations on the controller. The puck 332 can comprise a more rigid structure, such as carbon composite, along with possessing conductive properties. When force is transferred through the tab 328 to the puck 332, the puck 332 can function as a switch as the puck 332 engages the logic board 334 at an electrical contact point located on the logic board 334. The engagement between the puck and the logic board generates an electrical signal indicating that the force response has transitioned from the first stage (constant force) to the second stage (linearly increasing force) as depicted in FIG. 7. During the first stage, the tab 328 will deform to material resiliency limitation; after which, the force can be more directly applied to the stiffer puck 332, causing the puck to engage the logic board 334. The engagement of the puck on the logic board can be represented by the inflection point 702, that transitions the force distance interaction into the second stage, as depicted in FIG. 7. In a further aspect, puck 332 can comprise a conductive carbon impregnated rubber puck. Two electrically separate sets of exposed contacts can be oriented underneath the carbon puck. When a minimum actuation force is applied to the transfer assembly 326, the carbon puck will short the contacts providing a signal to the logic board 334 to indicate transition into the second stage— the force sensing stage. In the second stage, the variable force presented by the tab 328 comprising resilient material (e.g., a silicone stop) permits the measured HES values, given some calibration, to represent a proxy for force applied by the user.

As shown in FIGS. 5 and 6, the height (Hp) dimension is decreased due to deflection from the axial force applied by the plunger 324 to the switch assembly 326. The distance between the magnet and magnetic sensor on the circuit board 334 can be correlated to the measurements at the switch assembly 326. In the second stage (e.g., after the first inflection point 702), the linearly increasing force relative to the distance can be calibrated with the HES values to define the slope in the second stage. As depicted in FIG. 7, during an exemplary first stage of deflection, a user applied force transitions the trigger from zero to approximately six mm of deflection. The plunger 324 transfers the force to the tab 328, wherein the tab will deform, decreasing the height (Hp) dimension, represented by the x-axis on the graph of FIG. 7. Further, the approximately 6 mm of deflection can be derived from the angle ($\theta$) associated with the rotation of the trigger 316 in response to the applied force. For example, during the first stage, the angle measures 16 degrees before reaching the resiliency limits of the tab 328. When the deflection exceeds 6 mm, the system can enter a second stage represented by the first inflection point 702 of force transfer/deflection. Since the puck 332 comprises more material whose stiffness increases under compression, the puck 332 will not deflect at the same rate as the elastomer tab 328. The force transferred to the puck 332 will provide a different electrical indicator. For example, pulling the trigger 316 in the first stage can, in the simulated environment, represent an instance of holding an egg in your hand with little force. As the force deflection enters the second stage at the first inflection point 702, a linear increase of force yields an adjustment to the haptic response perceived by the user. In the AR/VR space, the adjustment to the haptic response in the trigger 316 can represent the linearly increasing force required to break the eff. In both the first stage and the second stage, calibration values can be used to map the force range of the controller.

In a further aspect, the controller 300 in accordance with the processor can implement a dynamic calibration to adjust the first inflection point 702 (first threshold) to the second stage. Dynamic recalibration aims to establish the minimum HES value at the first inflection point, which transitions the first stage to the second stage. Determining the minimum HES value is needed because the HES value may drift over time as wear and tear changes the relationships between the various elements in the subsystem. To initiate calibration, a factory calibrated version of this HES value can be initially stored as a baseline. During dynamic calibration, the HES readings can be time stamped. Further, a switch general purpose input/output (GPIO) signal generated on the logic board 334 can be associated with an interrupt request (IRQ) to momentarily interrupt the processor operations. Timestamps of the HES readings and the GPIO/IRQ event can be used to calculate an estimate of the HES value during the IRQ event. The HES readings can be correlated to the force readings determined from the switch assembly 326. From the correlation, the minimum HES value can be established that correlated to when the puck 332 engages the logic board 334, indicating when force-distance relationship enters the second stage 702 and haptic feedback changes from a constant force-distance relationship to an approximately linear force distance relationship (e.g. slope ~4N-mm as depicted in FIG. 7). In yet another aspect, dynamic calibration can be used to determine force values associated with the second inflection threshold 704, wherein the second stage ends. The second stage ends at a hard stop wherein the trigger becomes physically constrained by the engagement of the trigger plunger 324 and the switch assembly 326 such that the trigger can no longer move into the cavity 330.

Figure 8:
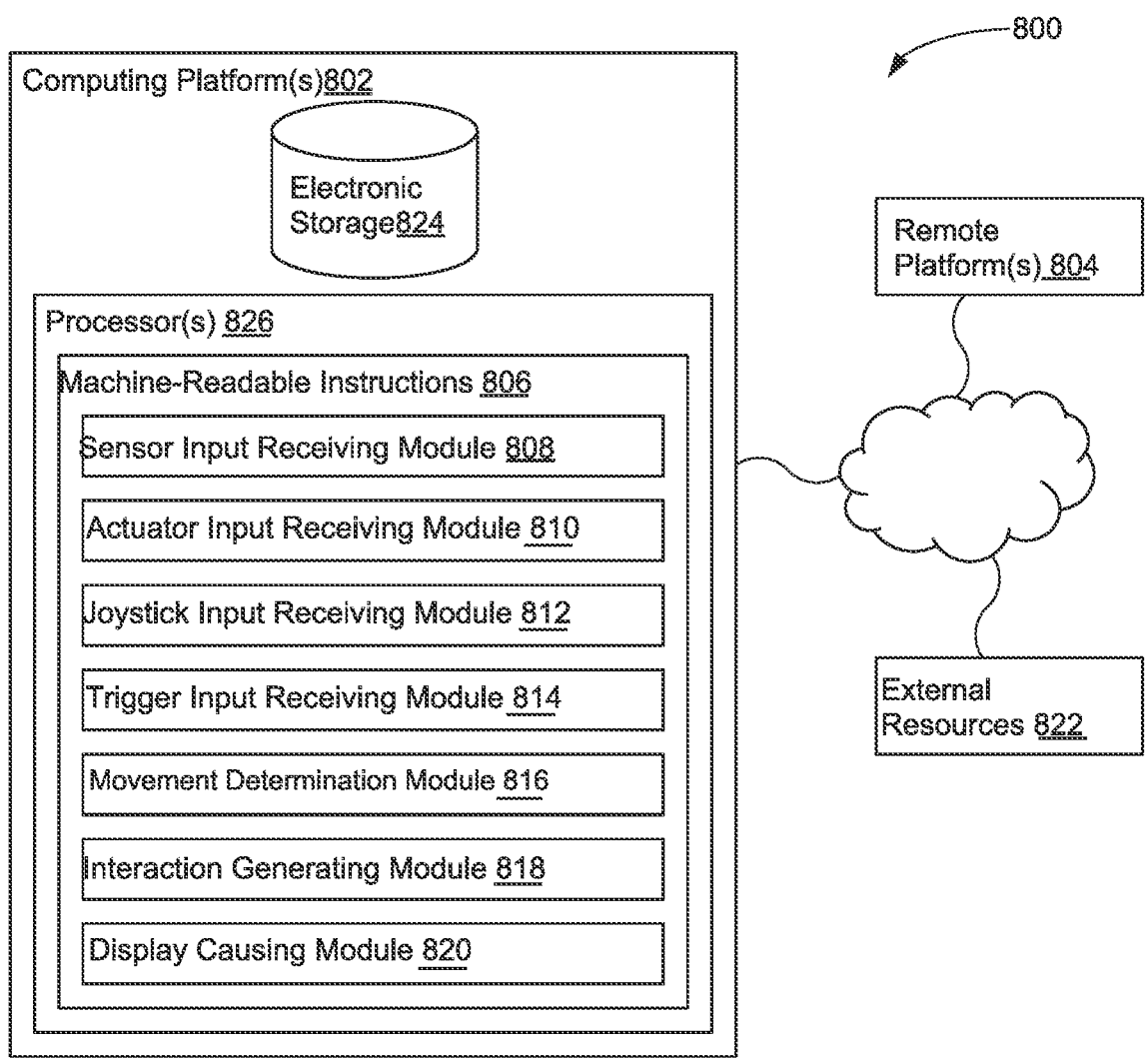
FIG. 8 illustrates a system configured for sensing inputs to a controller configured for interacting with an artificial reality environment, in accordance with one or more implementations.

FIG. 8 illustrates a system 800 configured for sensing inputs to a controller configured for interacting with an artificial reality environment, in accordance with one or more implementations. In some implementations, system 800 may include one or more computing platforms 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/or according to a client/server architecture, a peer-to-peer architecture, and/or other architectures. Users may access system 800 via computing platform(s) 802 and/or remote platform(s) 804.

Computing platform(s) 802 may be configured by machine-readable instructions 806. Machine-readable instructions 806 may include one or more instruction modules. The instruction modules may include computer program modules. The instruction modules may include one or more of sensor input receiving module 808, actuator input receiving module 810, joystick input receiving module 812, trigger input receiving module 814, movement determination module 816, interaction generating module 818, display causing module 820, and/or other instruction modules.

Sensor input receiving module 808 may be configured to receive sense inputs from sensors (e.g., the sensor(s) 304) on a housing 302 of the controller for self-tracking movements by the controller. Sensor input receiving module 808 may be configured to receive touchpad inputs from a touchpad (e.g., the touchpad 308) on a thumb plate (e.g., the thumb plate 306) of the controller.

Actuator input receiving module 810 may be configured to receive actuator inputs from actuators (e.g., the actuator(s) 310) on a thumb plate coupled to the base of the controller.

Joystick input receiving module 812 may be configured to receive joystick inputs from a joystick (e.g., the joystick 312) on the thumb plate of the controller.

Trigger input receiving module 814 may be configured to receive trigger inputs from triggers (e.g., trigger 316a and/or trigger 316b) on a handle (e.g., the handle 314) coupled to the base of the controller. The trigger inputs can be the force measurements determined from the switch assembly 326 and the logic board 334. The trigger inputs can also include measurements from the magnetic sensor. The trigger inputs can be used to determine the transition between the first stage of constant force and the second stage of linearly increasing force to distance. In a further aspect, the trigger input receiving module can be configured to implement dynamic calibration to adjust the haptic response experienced by the user. During dynamic calibration, timestamp measurements from the Hall effect sensor can be used to determine a calibration adjustment value. The adjustment value can aid the controller in maintaining an accurate haptic response during controller usage over time.

Movement determination module 816 may be configured to determine the movements of the controller through the sensing inputs.

Interaction generating module 818 may be configured to generate a virtual interaction based on one or more of the movements, the actuator inputs, the touchpad inputs, the joystick inputs, and/or the trigger inputs. The virtual interaction may emulate pointing (e.g., using an index finger) and/or pinching (e.g., using an index finger and thumb). The virtual interaction may provide an ability to discern force applied. By way of non-limiting example, the virtual interaction may include one or more of picking up a virtual object, pressing a virtual button, and/or other fine motor activities.

Display causing module 820 may be configured to cause display of the virtual interaction. The display may be caused through a head-mounted display (e.g., the HMD 200 and/or the HMD 252) for artificial reality environments. The display of the virtual interaction may include presenting a virtual hand that performs part or all of the virtual interaction.

In some implementations, computing platform(s) 802, remote platform(s) 804, and/or external resources 822 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 802, remote platform(s) 804, and/or external resources 822 may be operatively linked via some other communication media.

A given remote platform 804 may include one or more processors configured to execute computer program modules. The computer program modules may be configured to enable an expert or user associated with the given remote platform 804 to interface with system 800 and/or external resources 822, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, an augmented reality system (e.g., mixed reality HMD system 250), a head-mounted display (e.g., HMD 200 and/or HMD 252), a handheld controller (e.g., the controller 300), and/or other computing platforms.

External resources 822 may include sources of information outside of system 800, external entities participating with system 800, and/or other resources. In some implementations, some or all of the functionality attributed herein to external resources 822 may be provided by resources included in system 800.

Computing platform(s) 802 may include electronic storage 824, one or more processors 826, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 824 may comprise non-transitory storage media that electronically stores information. The electronic storage media of electronic storage 824 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 824 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 824 may include one or more virtual storage resources (e.g., cloud storage, a virtual private network, and/or other virtual storage resources). Electronic storage 824 may store software algorithms, information determined by processor(s) 826, information received from computing platform(s) 802, information received from remote platform(s) 804, and/or other information that enables computing platform(s) 802 to function as described herein.

Processor(s) 826 may be configured to provide information processing capabilities in computing platform(s) 802. As such, processor(s) 826 may include one or more of a digital processor, an analog processor, a digital circuit designed to process information, an analog circuit designed to process information, a state machine, and/or other mechanisms for electronically processing information. Although processor(s) 826 is shown in FIG. 8 as a single entity, this is for illustrative purposes only. In some implementations, processor(s) 826 may include a plurality of processing units. These processing units may be physically located within the same device, or processor(s) 826 may represent processing functionality of a plurality of devices operating in coordination. Processor(s) 826 may be configured to execute modules 808, 810, 812, 814, 816, 818, and/or 820, and/or other modules. Processor(s) 826 may be configured to execute modules 808, 810, 812, 814, 816, 818, and/or 820, and/or other modules by software; hardware; firmware; some combination of software, hardware, and/or firmware; and/or other mechanisms for configuring processing capabilities on processor(s) 826. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, 814, 816, 818, and/or 820 are illustrated in FIG. 8 as being implemented within a single processing unit, in implementations in which processor(s) 826 includes multiple processing units, one or more of modules 808, 810, 812, 814, 816, 818, and/or 820 may be implemented remotely from the other modules. The description of the functionality provided by the different modules 808, 810, 812, 814, 816, 818, and/or 820 described below is for illustrative purposes, and is not intended to be limiting, as any of modules 808, 810, 812, 814, 816, 818, and/or 820 may provide more or less functionality than is described. For example, one or more of modules 808, 810, 812, 814, 816, 818, and/or 820 may be eliminated, and some or all of its functionality may be provided by other ones of modules 808, 810, 812, 814, 816, 818, and/or 820. As another example, processor(s) 826 may be configured to execute one or more additional modules that may perform some or all of the functionality attributed below to one of modules 808, 810, 812, 814, 816, 818, and/or 820.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of a particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 9:
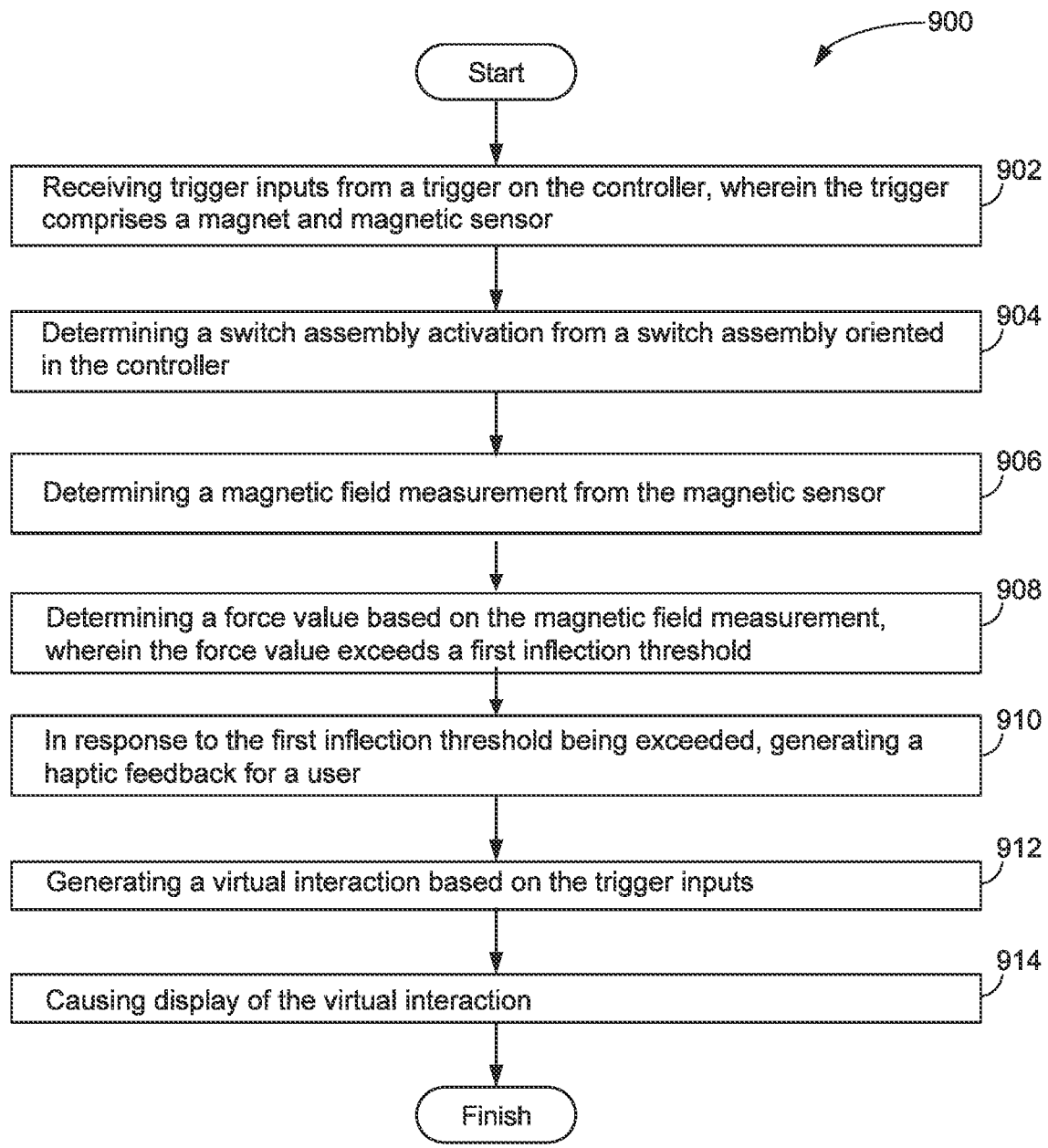
FIG. 9 illustrates an example flow diagram for sensing inputs to a controller configured for interacting with an artificial reality environment, according to certain aspects of the disclosure.

FIG. 9 illustrates an example flow diagram (e.g., process 900) for sensing inputs to a controller configured for interacting with an artificial reality environment, according to certain aspects of the disclosure. For explanatory purposes, the example process 900 is described herein with reference to FIGS. 1-8. Further for explanatory purposes, the steps of the example process 900 are described herein as occurring in serial, or linearly. However, multiple instances of the example process 900 may occur in parallel. For purposes of explanation of the subject technology, the process 900 will be discussed in reference to FIGS. 1-8.

At step 902, the process 900 may include determining a switch assembly activation from a switch assembly oriented in the controller. At step 904, the process 900 may include receiving trigger inputs from a trigger on the controller, wherein the trigger comprises a magnet and magnetic sensor. At step 906, the process 900 may include determining a magnetic field measurement from the magnetic sensor. At step 908, the process 900 may include determining a force value based on the magnetic field measurement, wherein the force value exceeds a first inflection threshold. At step 910, the process 800 may include in response to the first inflection threshold being exceeded, generating a haptic feedback for a user. At step 912, the process 900 may include generating a virtual interaction based on the trigger inputs. At step 914, the process 900 may include generating a virtual interaction based on the movements, the actuator inputs, the touchpad inputs, the joystick inputs, and/or the trigger inputs. At step 916, the process 900 may include causing display of the virtual interaction.

Figure 10:
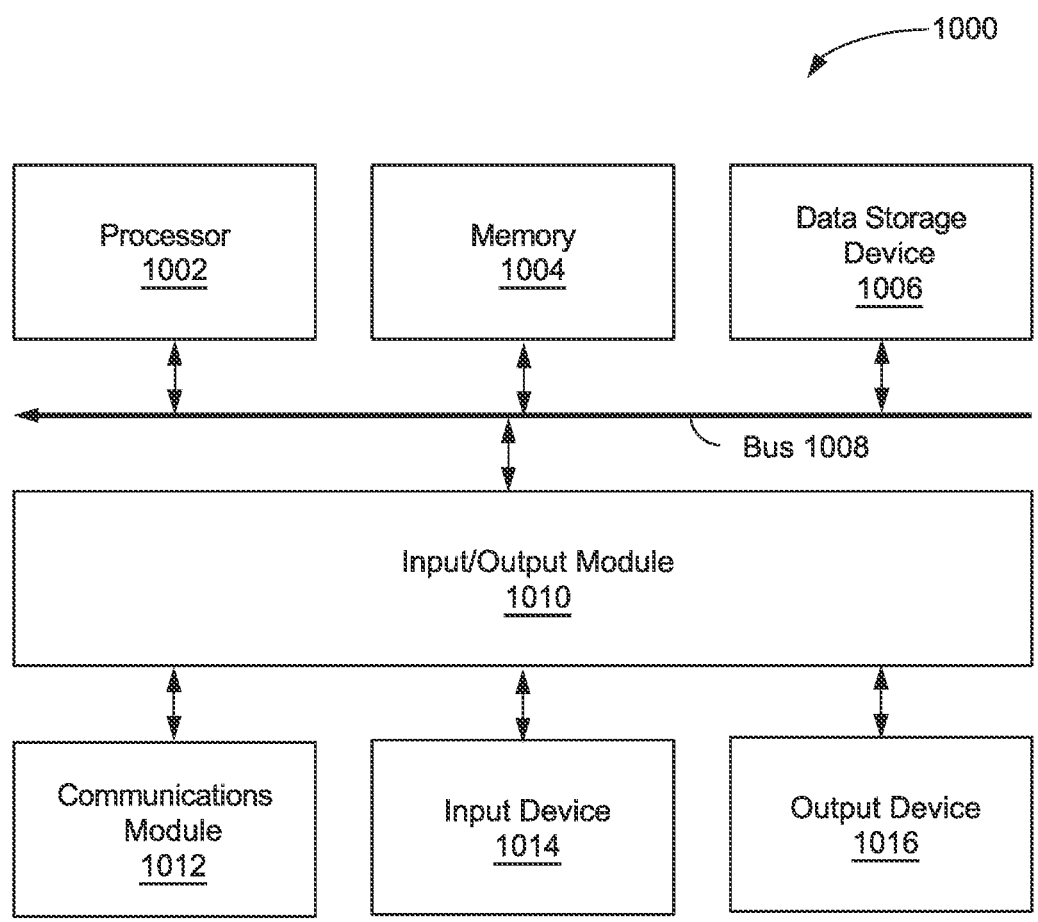
FIG. 10 is a block diagram illustrating an example computer system (e.g., representing both client and server) with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities. Computer system 1000 (e.g., server and/or client) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described gaming systems can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads game data and provides a game, information may be read from the game data and stored in a memory device, such as the memory 1004. Additionally, data from the memory 1004 servers accessed via a network the bus 1008, or the data storage 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage 1006.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A controller for interacting with an artificial reality environment, comprising:
   a housing including a handle, wherein the housing defines an internal cavity;
   a thumb plate coupled to the housing, the thumb plate comprising a touchpad, one or more actuators, and/or a joystick, wherein the one or more actuators comprise buttons and the controller is configured to activate a precision pinch comprising simultaneous inputs received from the touchpad and at least one trigger;
   a logic board including a processor oriented in the internal cavity; and
   a switch assembly oriented in the internal cavity and configured to engage the logic board,
   wherein the handle comprises at least one trigger oriented for movement into the internal cavity, the trigger including a magnet and magnetic sensor.

2. The switch assembly of claim 1, comprising:
   a tab structure comprising a resilient material; and
   a puck structure comprising a rigid electro-conductive material, wherein the puck structure is oriented to engage the logic board.

3. The controller of claim 1, wherein the controller is configured to generate haptic feedback to a user based on user applied force to the trigger.

4. The controller of claim 3, wherein the controller being configured to generate haptic feedback is based on an engagement between the switch assembly and the logic board, wherein the user applied force exceeds a first inflection threshold.

5. The controller of claim 4, wherein the haptic feedback comprises an approximately linear relationship between applied force and distance.

6. The controller of claim 4, wherein trigger movement is configured to stop based on the user applied force exceeding a second inflection threshold.

7. The controller of claim 1, wherein the magnetic sensor can receive and generate an electrical signal based on the Hall effect.

8. The controller of claim 1, further configured to implement a dynamic calibration, wherein a plurality of magnetic sensor measurements are correlated to a plurality of user-applied measurements from the switch assembly to determine the minimum magnetic sensor value at which a first inflection threshold is exceeded.

9. The controller of claim 1, wherein the controller is configured to communicatively pair with a head-mounted display for artificial reality environments.

10. The controller of claim 1, wherein the controllers comprise at least one camera.

11. The controller of claim 1, further comprising one or more haptics actuators.

12. A computer-implemented method for sensing inputs to a controller configured for interacting with an artificial reality environment, comprising:
   determining a switch assembly activation from a switch assembly oriented in the controller;
   receiving trigger inputs from a trigger on the controller, wherein the trigger comprises a magnet and a magnetic sensor;
   receiving trigger inputs from at least one trigger and a touchpad and a touchpad on a handle coupled to the controller, wherein the controller is configured to activate a precision pinch comprising simultaneous inputs received from the touchpad and at least one trigger;
   determining a magnetic field measurement from the magnetic sensor;
   determining a force value based on the magnetic field measurement, wherein the force value exceeds a first inflection threshold;
   in response to the first inflection threshold being exceeded, generating a haptic feedback for a user;
   generating a virtual interaction based on the trigger inputs; and
   causing display of the virtual interaction.

13. The computer-implemented method of claim 12, wherein the virtual interaction includes one or more of picking up a virtual object, pressing a virtual button, and/or other fine motor activities.

14. The computer-implemented method of claim 13, wherein the display is caused through a head-mounted display for artificial reality environments.

15. The computer-implemented method of claim 12, further comprising:
   receiving actuator inputs from actuators on a thumb plate coupled to the controller;
   receiving touchpad inputs from the touchpad on the thumb plate of the controller; and receiving joystick inputs from a joystick on the thumb plate of the controller.

16. The computer-implemented method of claim 12, wherein determining a force value based on the magnetic field measurement comprises:
   determining a first noise value associated with the magnetic sensor and a second noise value associated with analog-digital conversion; and
   determining a gain value based on the first noise value and the second noise value.

17. The computer-implemented method of claim 12, further comprising:
   implementing a dynamic calibration of the controller comprising determining a minimum magnetic sensor measurement wherein the first inflection threshold is exceeded; and
   providing an adjustment to a haptic feedback response to the user based on the minimum magnetic sensor measurement.

18. A system configured for sensing inputs to a controller configured for interacting with an artificial reality environment, the system comprising:
   one or more hardware processors configured by machine-readable instructions to: determine a switch assembly activation from a switch assembly oriented in the controller;
   receive trigger inputs from at least one trigger and a touchpad on a handle coupled to the controller, wherein the controller is configured to activate a precision pinch comprising simultaneous inputs received from the touchpad and at least one trigger;
   determine a magnetic field measurement from a magnetic sensor;
   determine a force value based on the magnetic field measurement, wherein the force value exceeds a first inflection threshold;
   in response to the first inflection threshold being exceeded, generate a haptic feedback for a user;
   generate a virtual interaction based on the trigger inputs, wherein the virtual interaction includes a fine motor activity; and cause display of the virtual interaction, wherein the display is caused through a head-mounted display for artificial reality environments, and wherein the display of the virtual interaction includes presenting a virtual hand that performs part or all of the virtual interaction.

19. The system of claim 18, wherein the machine-readable instructions are further configured to:

implement a dynamic calibration of the controller comprising determining a minimum magnetic sensor measurement wherein the first inflection threshold is exceeded; and provide an adjustment of a haptic feedback response based on the minimum magnetic sensor measurement.

* * * * *